United States Patent [19]

Wolar

[11] 4,314,320

[45] Feb. 2, 1982

[54] MEANS INCLUDING A LIGHT DISTRIBUTION LOUVER FOR THE PROTECTION OF LIGHTING FIXTURES

[76] Inventor: William Wolar, 59 Fremont Rd., North Tarrytown, N.Y. 10591

[21] Appl. No.: 139,838

[22] Filed: Apr. 14, 1980

Related U.S. Application Data

[62] Division of Ser. No. 956,104, Oct. 30, 1978.

[51] Int. Cl.³ .............................................. H02B 13/04

[52] U.S. Cl. ..................................... 362/342; 362/290; 362/360

[58] Field of Search ................ 362/279, 290, 342, 360

[56] References Cited

U.S. PATENT DOCUMENTS

| | | | |
|---|---|---|---|
| 1,935,621 | 11/1933 | Donnelly | 362/279 |
| 2,761,058 | 8/1956 | Lipscomb | 362/290 |
| 3,124,310 | 3/1964 | Lipscomb | 362/342 |
| 3,333,094 | 7/1967 | Steel | 362/279 X |
| 3,426,189 | 2/1969 | Deputy | 362/279 X |
| 3,604,922 | 9/1971 | Steel | 362/279 X |
| 4,059,754 | 11/1977 | Lewin | 362/342 X |

*Primary Examiner*—Peter A. Nelson

*Attorney, Agent, or Firm*—Eugene E. Geoffrey, Jr.

[57] ABSTRACT

A light distribution louver for a lighting fixture wherein the louver together with supporting apparatus closes at least the bottom of the light fixture. The louver may be of unitary construction or preferably formed of individual louver sections or sectors depending upon the shape of the supporting apparatus. The louver sections or sectors may have fixed or movable vanes and in the case of sections, they may be positioned in a variety of orientations to attain varied light distribution characteristics. The invention further contemplates a structure wherein the supporting apparatus encloses the lighting fixture to afford more complete protection.

8 Claims, 24 Drawing Figures

Figure 1:
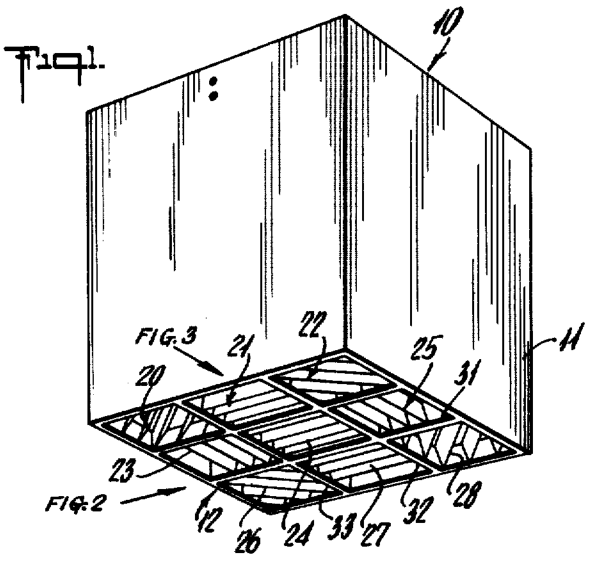

MEANS INCLUDING A LIGHT DISTRIBUTION LOUVER FOR THE PROTECTION OF LIGHTING FIXTURES

This application is a division of Ser. No. 956,104, filed Oct. 30, 1978.

This invention relates to lighting fixtures and more specifically to a novel and improved protective louver assembly and an associated support for protecting a lighting fixture within the housing.

Lighting fixtures, particularly when used in open or outdoor areas such as garages, parking areas for vehicles and the like are subjected not only to the weather but also to damage by vandals. Moreover, lighting fixtures generally are provided with preselected light distribution characteristics that cannot be easily modified to meet the requirements of specific applications.

The lighting fixture assembly in accordance with the invention overcomes the problems heretofore encountered particularly in unprotected outdoor lighting applications. This is attained in one aspect of the invention through the provision of an outer protective housing and a novel and improved light distributing means which is readily adjustable to afford a wide range of light distribution patterns.

Another object of the invention resides in the provision of a novel and improved protective housing and light distribution means for lighting fixtures that is characterized by its simplicity, versatility and ease of installation.

Still another object of the invention resides in the provision of a novel and improved protective light distributing means for lighting fixtures and associated supporting means that is readily adjustable to achieve a wide variety of patterns and at the same time affords a high degree of protection for the lighting fixture.

More specifically, the invention provides among other things a protective louver assembly for attachment to or enclosing a light fixture wherein the louver assembly may be formed of fixed or adjustable vanes and the louver may be either a unitary element or formed in sections separately adjustable.

The above and other objects and advantages of the invention will become more apparent from the following description and accompanying drawings forming part of this application.

IN THE DRAWINGS

FIG. 1 is a perspective view of one embodiment of a housing and light distribution means for a lighting fixture in accordance with the invention.

Figure 2:
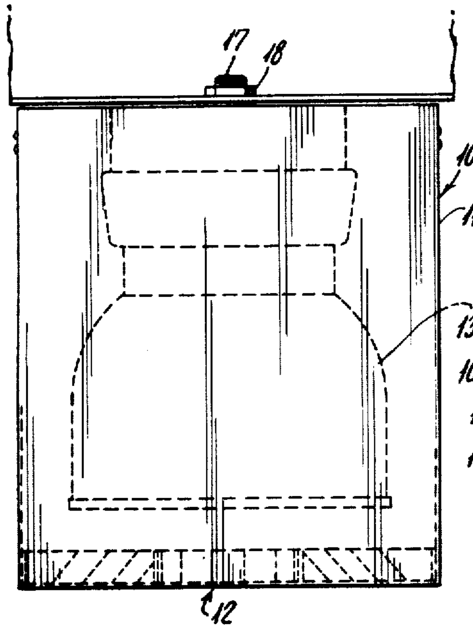
Figure 3:
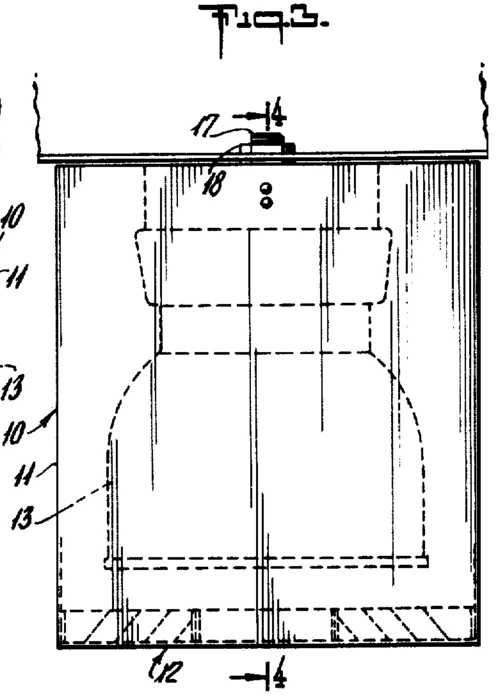
Figure 4:
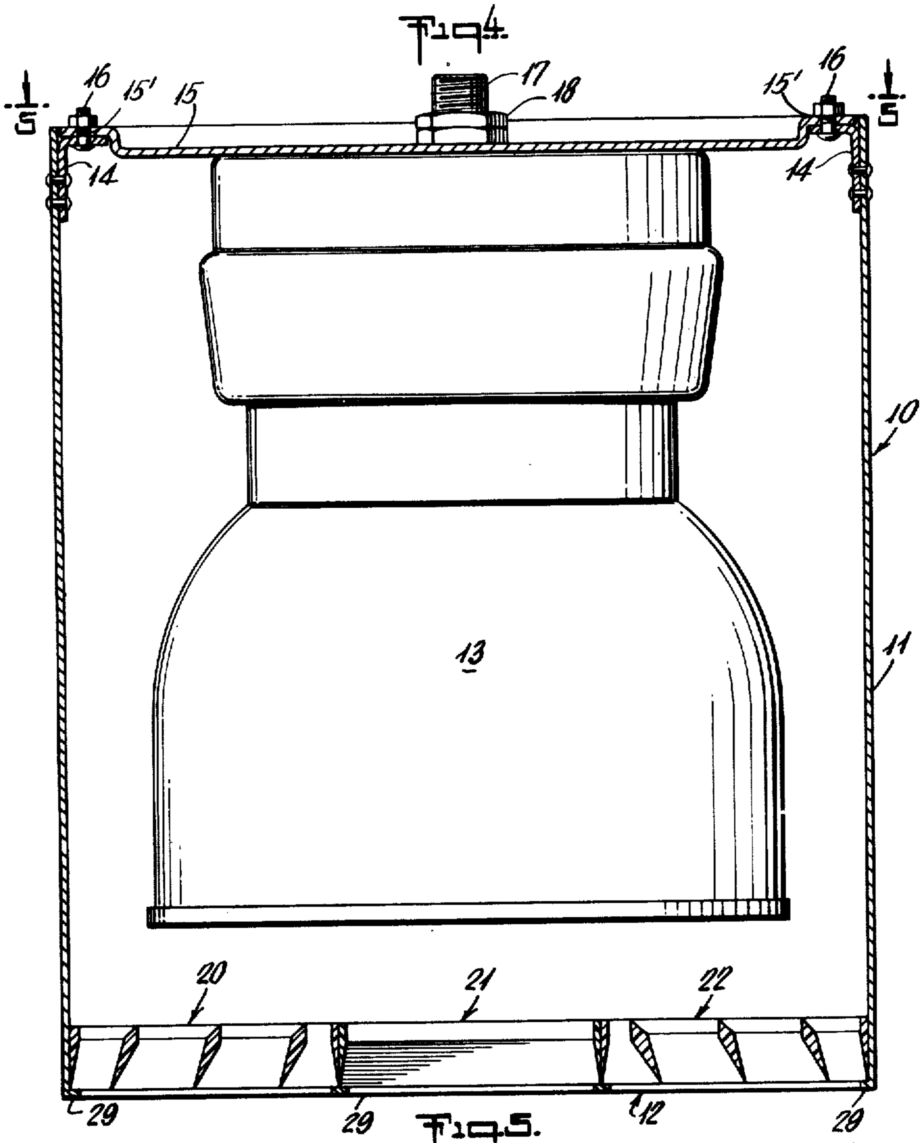
Figure 5:
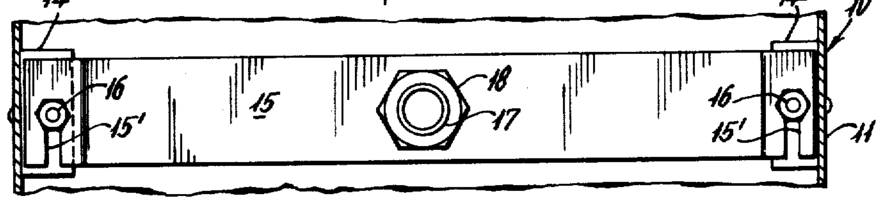
Figure 6:
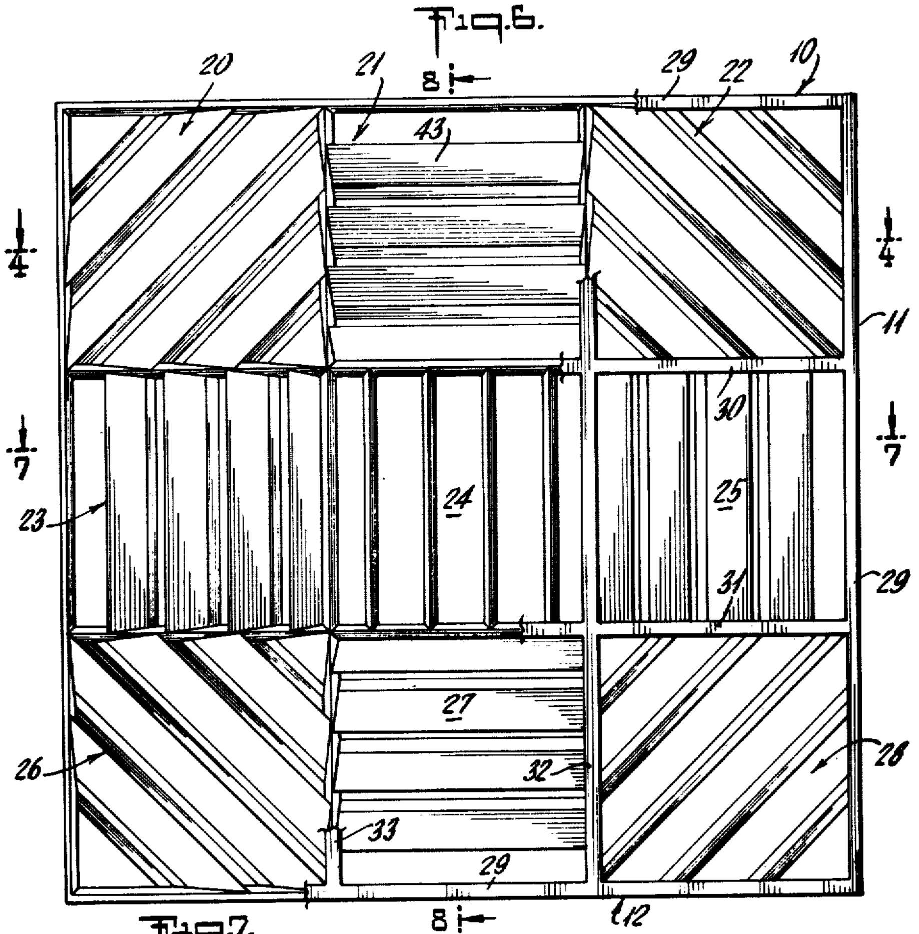
Figure 7:
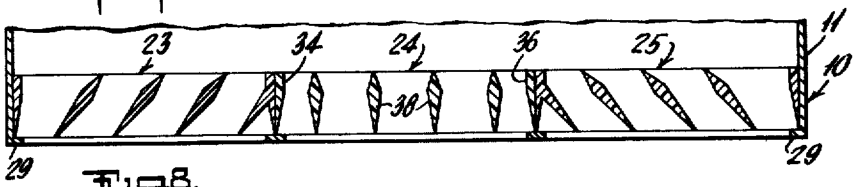
Figure 8:
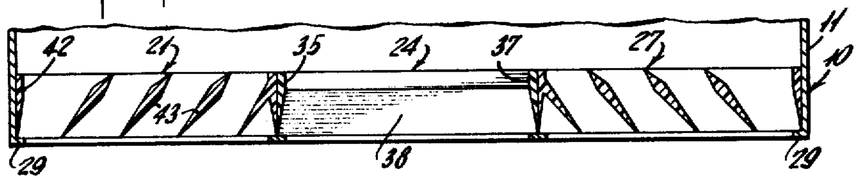
Figure 9:
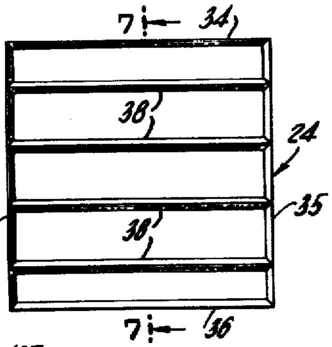
Figure 10:
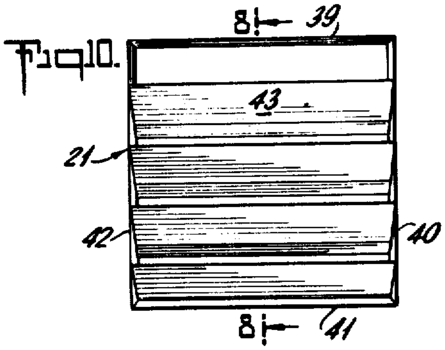
Figure 11:
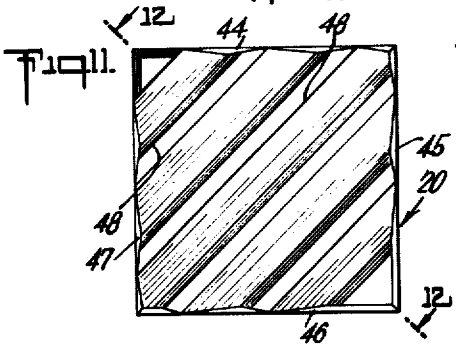
Figure 13:
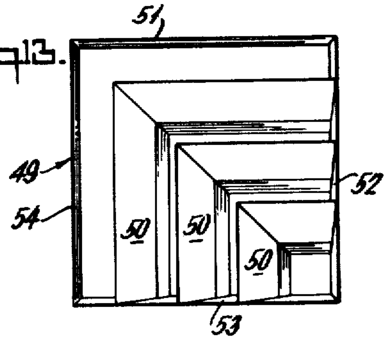
Figure 14:
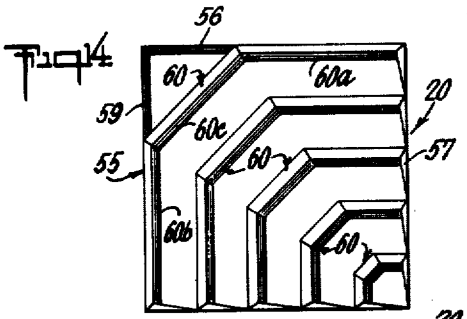
Figure 24:
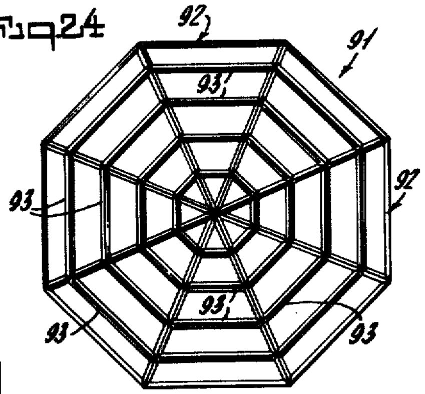
Figure 12:
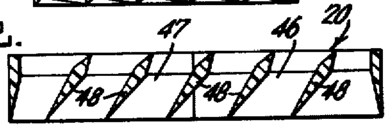
Figure 15:
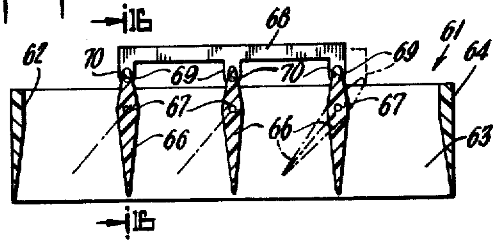
Figure 16:
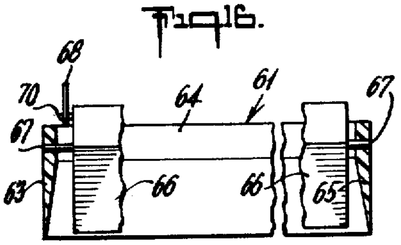
Figure 17:
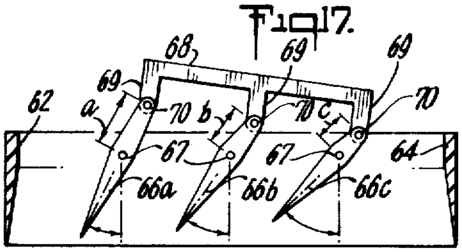
Figure 18:
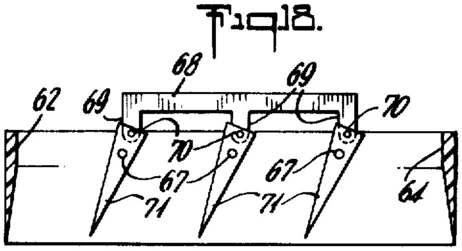
Figure 19:
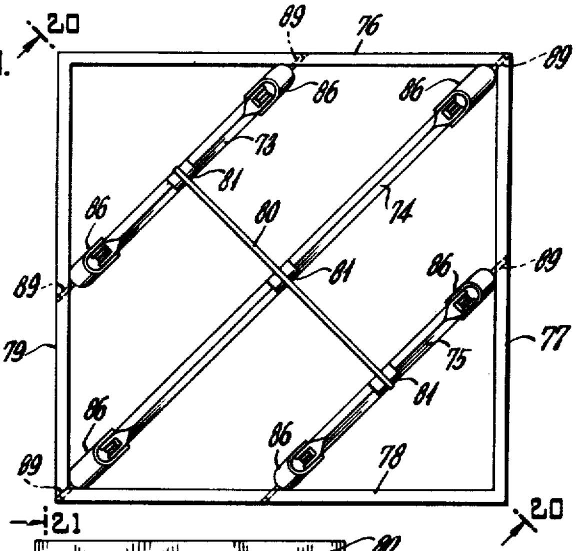
Figure 20:
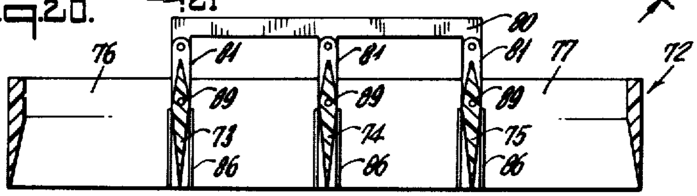
Figure 21:
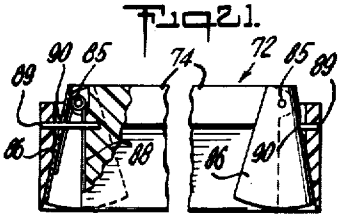
Figure 23:
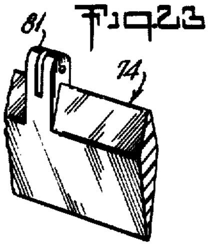
Figure 22:
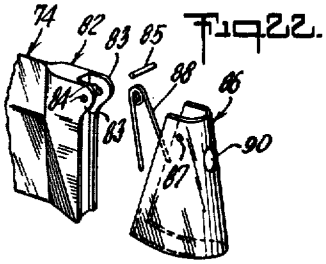

FIG. 2 is an elevational view of FIG. 1 taken in the direction of arrow 2 thereof, FIG. 3 is an elevational view of FIG. 1 taken in the direction of arrow 1 thereof, FIG. 4 is a cross sectional view taken along the line 4—4 of FIGS. 3 and 6, FIG. 5 is a fragmentary top view of FIG. 4 taken along the line 5—5 thereof, FIG. 6 is a bottom view of the louver assembly as illustrated in FIG. 1, FIGS. 7 and 8 are cross sectional views of FIG. 6 taken along the lines 7—7 and 8—8 thereof, FIG. 9 is a plan view of one form of a louver section for use in the louver assembly shown in FIG. 6, FIG. 10 is a plan view of another form of a louver section for use in the louver assembly shown in FIG. 6, FIG. 11 is a plan view of still another form of a louver section for use in the louver assembly shown in FIG. 6, FIG. 12 is a cross sectional view of FIG. 11 taken along the line 12—12 thereof, FIGS. 13 and 14 are plan views of modified forms of louver sections which may be utilized with the louver assembly of FIG. 6, FIG. 15 is a cross sectional view of a louver similar to that illustrated in FIG. 10 and illustrating one embodiment of the invention for adjusting the louvers, FIG. 16 is a cross sectional view of FIG. 15 taken along the line 16—16 thereof, FIG. 17 is a view similar to FIG. 16 and illustrates an embodiment of the invention wherein the vanes have different inclinations, FIG. 18 is a view similar to FIG. 16 and illustrates an embodiment of the invention utilizing a modified vane configuration, FIG. 19 is a plan view of still another modified embodiment of the invention wherein the vanes are disposed diagonally and are also adjustable, FIG. 20 is a cross sectional view of FIG. 19 taken along the line 20—20 thereof, FIG. 21 is a fragmentary cross sectional view of FIG. 20 taken along the line 21—21 thereof, FIG. 22 is an exploded perspective view of the end portion of one of the vanes shown in FIG. 19, FIG. 23 is a perspective view of a fragmentary portion of one of the vanes of FIG. 19, and FIG. 24 is a plan view showing a hexagonal configuration.

Referring now to the drawings, and more specifically to FIGS. 1 through 8, the lighting fixture in accordance with one embodiment of the invention is generally denoted by the numeral 10 and comprises in the instant embodiment a rectangular housing 11 and a louver assembly generally denoted by the numeral 12. While the protective housing 11 is illustrated enclosing the entire fixture in many instances the enclosure may comprise louver supporting means which is affixed to a light fixture. The housing 11 and the louver assembly 12 enclose a light source 13 and afford protection both against the weather and vandals particularly when the structure is utilized outdoors or in open parking areas. The light source 13 may be held in position in any suitable manner though in the instant embodiment of the invention the housing 11 is provided with a pair of angle brackets 14 as viewed more specifically in FIG. 4 and these brackets in turn support a bracket 15 spanning the top of the housing 11 and secured to the angle brackets 14 by nut and bolt assemblies 16. The bracket 15 has a central opening to receive a mounting nipple 17 carried by the fixture and a nut 18 secures the fixture in position on the bracket 15. To facilitate removal of the fixture the ends of the bracket 15 may include slotted openings 15' to facilitate disengagement of the bracket from the nut and bolt assemblies 16.

A louver assembly 12 in the embodiment of the invention shown in FIGS. 1 through 8 consists of nine individual louver sections denoted by the numerals 20 through 28. These sections are supported at the bottom edge of the housing 11 or other louver retaining means as referred to above by a peripheral flange 29 and a grid structure consisting of intersecting parallel supports or ribs 30, 31, 32 and 33.

It will be apparent from the description thus far that the arrangement of the louver sections 20 through 28 represent only one arrangement for distribution of the light from the source 13 to cover a uniformly large area immediately below the light source. By appropriate arrangement of the louver sections the light can be distributed throughout specific areas or concentrated in a relatively small area. For instance, it will be observed that the louver section 24 directs the light downwardly while the louvers 23 and 25 direct the light outwardly to each side of the light fixture. The louvers 21 and 27 direct the light outwardly and at right angles to the light directed by the louvers 23 and 25 while the corner louvers all direct the light outwardly diagonally. As an example of the versatility of this louver arrangement it will be observed that the louvers 21, 23, 25 and 27 are substantially identical and if desired all nine louver sections could consist of a single type of louver section such as the louver section 21 and the angle of the vanes of each section can be directed in the same direction in which case all of the light would be essentially directed to one side of the fixture. As will be shown the vanes embodied in each of the louver sections are readily made adjustable so that the angle at which light is directed can be modified as desired.

Various forms of louver sections are illustrated in FIGS. 9 through 22. Considering first the central louver section 24 as shown in FIGS. 6, 7, 8 and 9 it will be observed that it is in the form of a square having side walls 34 through 37 with a plurality of vanes 38 supported by the side walls 35 and 37. Each of the vanes 38 is in the shape of a modified diamond configuration as viewed in FIG. 7 with the bottom triangular portion being substantially longer than the upper triangular portion. This particular vane configuration functions to provide light dispersion over an area substantially larger than the size of the rectangular section and each vane is preferably provided with light reflecting surfaces. The side walls 34 through 37 of the section 24 also have a lower tapered portion as illustrated in FIGS. 7 and 8 and thus cooperate with the vanes 38 to provide more effective light distribution.

The louver sections 21, 23, 25 and 27 are alike and thus only the louver 21 is illustrated in FIG. 10. A cross section of the louver is also shown in FIG. 8. More specifically the louver 21 is formed in a manner similar to that described in connection with the louver 24 (FIG. 9) in that it has side walls 39 through 42 with a plurality of vanes 43 supported by the side walls 40 and 42. The configuration of the vanes 43 and side walls 39 through 42 are similar to the configuration of the side walls and vanes of the louver section 24 shown in FIG. 9 but since the vanes 43 in the louver section 21 are inclined the light will be directed at an angle relative to the lighting fixture.

The corner louvers 20, 22, 26 and 28 as shown in FIGS. 4 and 6 are substantially identical and louver section 20 is illustrated in detail in FIGS. 11 and 12. This louver section as in the case of previous sections is square and is provided with side walls 44, 45, 46 and 47. A plurality of vanes 48 are positioned diagonally and are inclined as shown more clearly in FIG. 12. The vanes 48 have essentially the same configuration as the vanes 38 and 43 previously described and similarly the walls 44 through 47 also have a tapered configuration corresponding to that described in connection with louver sections shown in FIGS. 9 and 10.

FIGS. 13 and 14 illustrate modified configurations of a corner reflector which may be utilized with this invention. In FIG. 13 it will be observed that the louver section generally denoted by the numeral 49 is essentially square and embodies three corner shaped vanes 50. The side walls 51 through 54 have essentially the same configuration as the side walls of the louver sections previously described and the vanes 50 would be fixedly secured to and carried by the side walls 52 and 53. In the form of the invention shown in FIG. 14 and denoted generally by the numeral 55 it will be observed that the louver section again is essentially square having side walls 56 through 59 with a plurality of vanes 60. Each vane 60 has portions 60*a* and 60*b* disposed essentially at right angles one relative to the other with a diagonally disposed connecting section 60*c*.

In certain lighting applications embodying a lighting fixture in accordance with the invention it may be desirable to provide louver sections having adjustable vanes. For this purpose a structure such as that shown in FIGS. 15 and 16 may be provided. In these figures the louver section is denoted by the numeral 61, is of square configuration and has peripheral walls 62 through 65. The vanes 66, which have substantially the same configuration as the vanes previously discussed, are pivotally attached to the peripheral walls 53 and 65 by pins 67. The upper ends of the vanes 66 as shown in FIGS. 15 and 16 are coupled by a link 68 having downwardly extending tabs 69 each pivoted to one of the vanes 66 by a pin 70. With this arrangement displacement of the link 68 will automatically tilt the three vanes 66 simultaneously. By arranging the pins 67 so that they snuggly fit the cooperating openings in the side walls 63 and 65 and the ends of the vanes 66, the vanes will remain in the adjusted position.

A modified form of the structure shown in FIGS. 15 and 16 is illustrated in FIG. 17 and like numerals have been used to denote corresponding elements in the two forms of the invention. In FIG. 17 the three vanes have been denoted by the numerals 66*a*, 66*b* and 66*c* and it will be observed that while the three vanes are simultaneously adjustable, the angle of displacement of vane 66*c* from the vertical position will be greater than the angle of displacement of the other vanes. In the illustrated embodiment of the invention the vane 66*a* moves through the smallest angle while the vane 66*b* moves through a slightly larger angle and the vane 66*c* moves through the greatest angle. This function is attained by modifying the distance between the pivots 67 and 70 on each of the vanes. For instance the distance a between the pivots 67 and 70 on vane 66*a* would be the longest of the three distances. The distance b between the pivots 67 and 70 on vane 66*b* would be slightly smaller than that of vane 66*a* and the distance c between the pivots 67 and 70 on vane 66*c* would be still smaller. It is also apparent that the same operation occurs whether the control arm 68 is moved to the left or to the right as shown in FIG. 17.

A still further embodiment of the invention is illustrated in FIG. 18. In this figure the structure is substantially identical to that shown in FIG. 15 and accordingly like numerals have been utilized to denote like components. In this figure however the vanes denoted by the numeral 71 are of slightly different configuration than that illustrated in FIG. 15 in that the vanes in FIG. 18 are essentially triangular as distinguished from the modified diamond configuration illustrated in FIG. 15.

FIGS. 19 through 23 illustrate an embodiment of the invention wherein diagonally disposed vanes are adjustable within a square louver section. In this embodiment of the invention the louver section is generally denoted by the numeral 72 and comprises three vanes 73, 74 and 75 each of a modified diamond configuration as illustrated in the figures previously discussed. The vanes are disposed diagonally within the square structure which is provided with side walls 76 through 79 each having a cross sectional configuration similar to the side walls illustrated for instance in connection with FIG. 15. The vanes are simultaneously adjustable by means of a control arm 80 pivotally coupled to upwardly extending bifurcated members 81 on each of the vanes and shown more clearly in FIG. 23. In as much as the three vanes are substantially identical with the exception of the length, only the vane 74 will be described in detail and this vane is shown more clearly in FIGS. 21 through 23.

Each end of the vane 74 is formed with an outwardly extending portion generally denoted by the numeral 82 and it consists of two vertically disposed portions 83 positioned in a spaced relationship and having openings 84 for receiving a pivot pin 85. A U-shaped element 86 of generally triangular configuration overlies the end portion 82 and has a pair of openings 87 which are also engaged by the pivot pin 85 so that the member 86 can move relative to the vane 74 and about the pivot pin 85. A spring 88 engages the pin 85 with the ends of the spring functioning to displace the member 86 outwardly. The vane is pivotally secured in position by pins 89 extending through two corners of the louver section 72 as viewed in FIG. 19. Each of these pins extends through an opening 90 in the pivoted member 86 and into the vane body as will be observed more clearly in FIG. 21.

With the arrangement as discussed above as the vane 74 is tilted in either direction the pivoted members 86 on each end of the vane 74 will be displaced inwardly by reason of their contact with the adjoining walls and permit the vane to be inclined. At the same time gaps between the ends of the vane and the adjoining side wall of the louver section are avoided. With reference to the vanes 73 and 75, as they are moved in one direction, the pivoted members 86 will move outwardly while upon movement in the other direction the members will be displaced inwardly.

It is evident from the foregoing description that the invention not only protects a lighting fixture from the weather as well as from vandals but at the same time facilitates the attainment of a wide variety of light distribution characteristics merely by utilizing appropriate louver sections. For more precise control, louver sections with adjustable vanes may be employed depending on the light distributing characteristics that may be required.

While the invention thus far described has involved an essentially square housing or other supporting means with square louver sections carried at the bottom of the housing for attainment of desired light distributing characteristics it is quite evident that the housing as denoted by the numeral 11 in FIG. 1 or other supporting means may, of course assume other desired configurations. For instance, the housing or supporting means may have a hexagonal configuration in which case the lower end of the housing would be closed by a hexagonal louver as illustrated generally in FIG. 24 and denoted by the numeral 91. In this embodiment of the invention the louver may be formed in one piece or may comprise eight sectors 92 each having essentially a plurality of vertically disposed vanes. From the foregoing description of the square louver sections, it is quite evident that the louver sectors 92 may have vanes disposed at any desired angle and may even embody adjustable vanes. It is also evident that the housing may assume any desired configuration and any number of louvers having square or rectangular sections or sectors may be employed as the case may be. Moreover, the protective enclosure and louver assembly as described in their various forms may be formed of any desired materials such as plastics, metals and the like having strengths which will afford adequate protection.

While only certain embodiments of the invention have been illustrated and described it is apparent that alterations, changes and modifications may be made without departing from the true scope and spirit thereof.

What is claimed:

1. A louver for distribution of light from a lighting fixture comprising four side walls forming a rectangular frame, a plurality of diamond shaped vanes each pivotally carried by two of said side walls and angularly adjustable about the axis of the pivots relative thereto, and a control arm pivotally coupled to each of said vanes at points spaced from the first said pivots for simultaneous adjustment of said vanes.

2. A louver for distribution of light from a lighting fixture according to claim 1 wherein said control arm is pivoted to each vane at points spaced from said axis so that the distances between said axes and said points differ between successive vanes whereby a given movement of the control arm will displace said vanes through different angles.

3. A louver for distribution of light from a lighting fixture according to claim 1 wherein each of said side walls has a tapered configuration and said vanes each have a modified diamond cross sectional configuration with the triangular portion on one side of the pivots being substantially longer than the triangular portion on the other side of the pivot.

4. A louver for distribution of light from a lighting fixture comprising a frame and a plurality of vanes carried by said frame, each of said vanes having a diamond configuration with a short axis and a long axis and wherein the short axis intersects the long axis at a point between the center and one end of the long axis.

5. A louver for distribution of light from a lighting fixture according to claim 4 wherein said vanes are adjustable.

6. A louver for distribution of light from a lighting fixture according to claim 4 which includes a plurality of louver sections each having a peripheral frame with vanes supported thereby.

7. A louver assembly for lighting fixtures for the distribution of light from a light source comprising a plurality of individually adjustable sections each having a peripheral wall and light directing vanes carried by said wall for directing light at selected angles and means for supporting said sections in contiguous relationship one to the others whereby desired light distribution characteristics may be attained with selected sections and the positioning thereof one relative to the others.

8. A louver assembly according to claim 7 wherein said peripheral wall of each section is in the form of a rectangular frame having four side walls and each of said vanes is carried by two of said side walls.

* * * * *